United States Patent
Vock et al.

(10) Patent No.: US 6,825,777 B2
(45) Date of Patent: Nov. 30, 2004

(54) SENSOR AND EVENT SYSTEM, AND ASSOCIATED METHODS

(75) Inventors: Curtis A. Vock, Boulder, CO (US); Adrian F. Larkin, Chelmsford (GB); Perry Youngs, Longmont, CO (US)

(73) Assignee: PhatRat Technology, Inc., Niwot, CO (US)

( * ) Notice: Subject to any disclaimer, the term of this patent is extended or adjusted under 35 U.S.C. 154(b) by 363 days.

(21) Appl. No.: 09/848,445

(22) Filed: May 3, 2001

(65) Prior Publication Data

US 2002/0077784 A1 Jun. 20, 2002

Related U.S. Application Data

(63) Continuation-in-part of application No. 09/607,678, filed on Jun. 30, 2000.
(60) Provisional application No. 60/201,544, filed on May 3, 2000.

(51) Int. Cl.[7] ............................................... G08C 19/06
(52) U.S. Cl. ............................. 340/870.05; 340/870.11; 340/870.16; 340/870.06; 340/573.1; 340/539.11; 340/323 R; 702/141; 702/178
(58) Field of Search ....................... 340/870.05, 870.06, 340/870.11, 870.16, 573.1, 323 R, 539.11; 702/141, 178

(56) References Cited

U.S. PATENT DOCUMENTS

| | | | | |
|---|---|---|---|---|
| 5,617,084 A | * | 4/1997 | Sears | 340/870.02 |
| 5,636,146 A | * | 6/1997 | Flentov et al. | 702/176 |
| 5,960,380 A | * | 9/1999 | Flentov et al. | 702/178 |
| 6,157,898 A | * | 12/2000 | Marinelli | 702/141 |
| 6,167,356 A | * | 12/2000 | Squadron et al. | 702/166 |
| 6,516,284 B2 | * | 2/2003 | Flentov | 702/142 |
| 6,570,526 B1 | * | 5/2003 | Noller et al. | 342/109 |

* cited by examiner

*Primary Examiner*—Albert K. Wong
(74) *Attorney, Agent, or Firm*—Lathrop & Gage, L.C.

(57) ABSTRACT

The system of the invention is used in measuring sports metrics at an event or venue. The system includes "n" sensors, "m" repeaters, a base station and an operations terminal. One or more sensors attach to each athlete (and/or the athletes vehicle) at the event or venue to determine a sports metric, e.g., airtime, g's, drop distance, spin, rotation. The information about the sports metric is transmitted to one or more repeaters; and that information is relayed to the base station. The operations terminal provides a user interface, and may further interface with a judging station or TV to provide the sports metric, in near real-time, to judges, viewers and others at the event or venue.

10 Claims, 7 Drawing Sheets

SENSOR AND EVENT SYSTEM, AND ASSOCIATED METHODS

RELATED APPLICATIONS

This application is a continuation-in-part of U.S. application Ser. No. 09/607,678, entitled Event and Sport Performance Methods and Systems, filed Jun. 30, 2000, and claims priority to U.S. Provisional Application No. 60/201,544, entitled Sensor & Event System and Associated Methods, filed May 3, 2000, each of which is expressly incorporated herein by reference.

BACKGROUND

Providing sport metrics at events is desirable from the viewpoint of audience participation and TV viewership. Providing sports metrics in an objective format is also desirable from the viewpoint of judging and assessing athletic capability. One object of the invention is to provide sport metrics to audiences and TV in near real-time.

SUMMARY OF THE INVENTION

The invention of one aspect provides a system for measuring sports metrics at an event or venue. The system includes "n" sensors, "m" repeaters, a base station and an operations terminal. One or more sensors attach to each athlete (and/or the athletes vehicle) at the event or venue to determine a sports metric, e.g., airtime, g's, drop distance, spin, rotation. The information about the sports metric is transmitted to one or more repeaters; and that information is relayed to the base station. The operations terminal provides a user interface, and may further interface with a judging station or TV to provide the sports metric, in near real-time, to judges, viewers and others at the event or venue.

In operation, sensors communicate sports metric data to the repeater. The repeater relays data to the base station, and the operations terminal collects the sports metric data for use by an operator.

Typically such data are communicated frequently and at least once per second. By way of example, one sports metric is airtime. In accord with one aspect, a sensor detects a take off event and that information is transmitted to a repeater. In another aspect, the sensor detects a landing and that information is transmitted to a repeater. The time between the take off event and landing event is the airtime. Transmitting the take off time separately permits a real time display of airtime data to TV when the athlete is in the air, a desirable feature. In still another aspect, the sensor calculates the airtime data from the take off event and the landing event; and the airtime data itself is communicated to a repeater.

In one aspect, each sensor has a processor (e.g., Microchip PIC 17C7XX), at least one and preferably three or more accelerometers (e.g., ADXL digital accelerometers from Analog Devices), an RF section (e.g., TX900SR from RF Laboratories, Inc.), and a battery. Preferably, the RF section is programmable in the 900 MHz or 433 MHz region. In one aspect, the RF section transmits spread spectrum information. In another aspect, the RF section is programmable for one or more channels in the selected MHz region. In still another aspect, the RF section transmits in a first channel and a second channel, selectively, to transmit data in a redundant fashion.

In one aspect, the RF section is temperature controlled to account for temperature variations, so that sensors continue to communicate to repeaters even though temperature differences exist between the sensor and repeater.

In another aspect, one or more accelerometers have DC capability to detect free fall. Free fall is used to determine airtime, in one aspect of the invention. Free fall information may also be used to augment other techniques of determining airtime, such as described in U.S. Pat. Nos. 5,960,380 and 5,636,146, each of which is incorporated by reference.

BRIEF DESCRIPTION OF THE INVENTION

Figure 4:
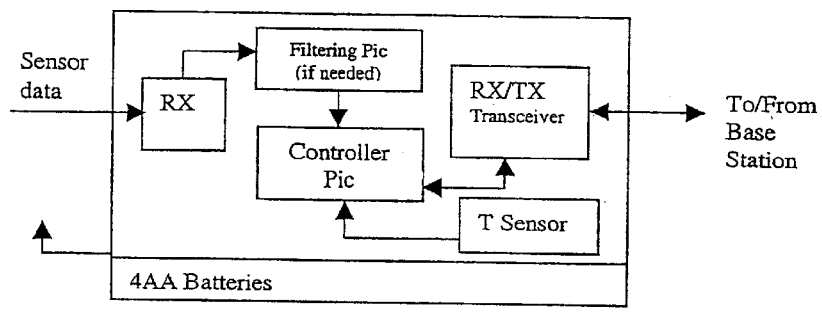
Figure 5:
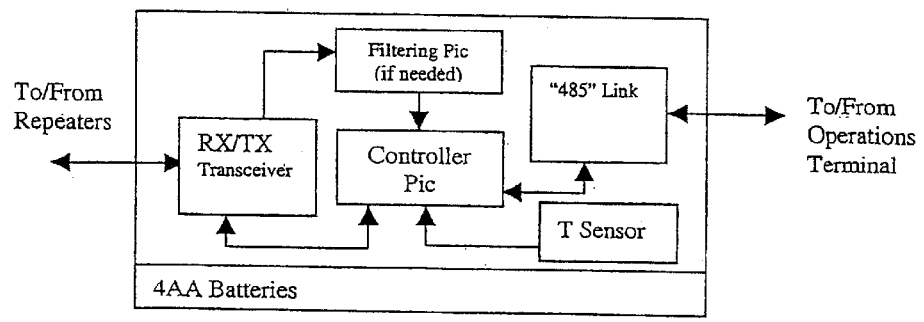
Figure 6:
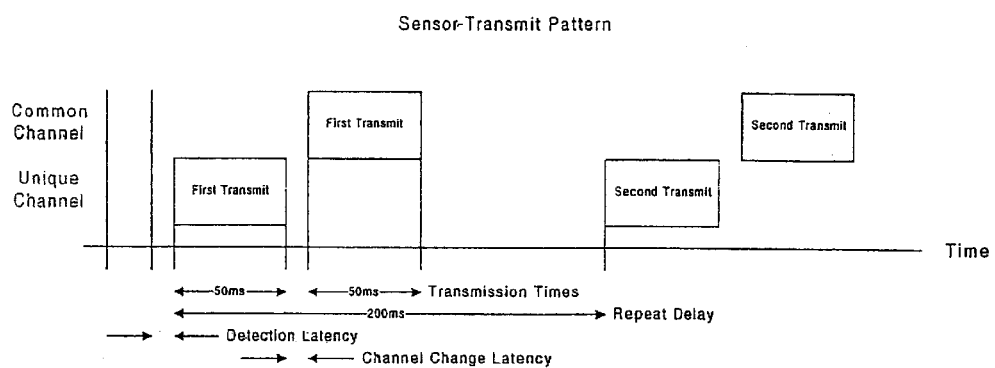
Figure 7:
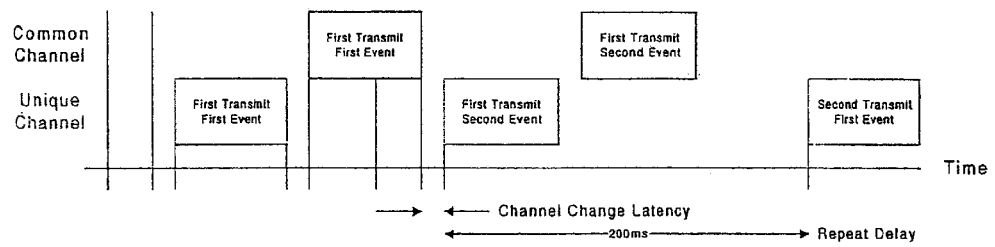
Figure 8:
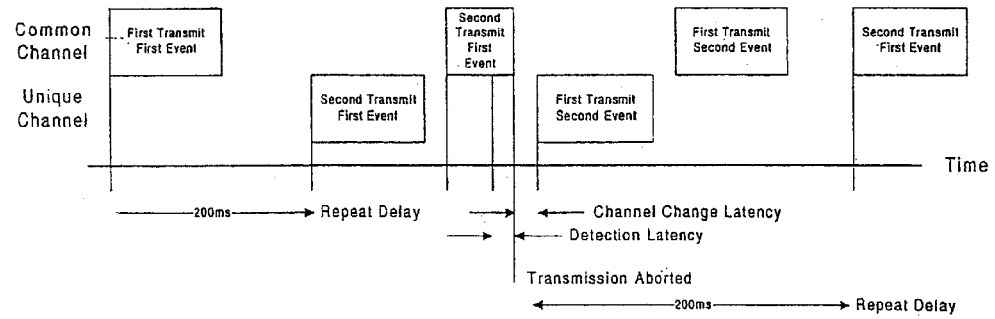
Figure 9:
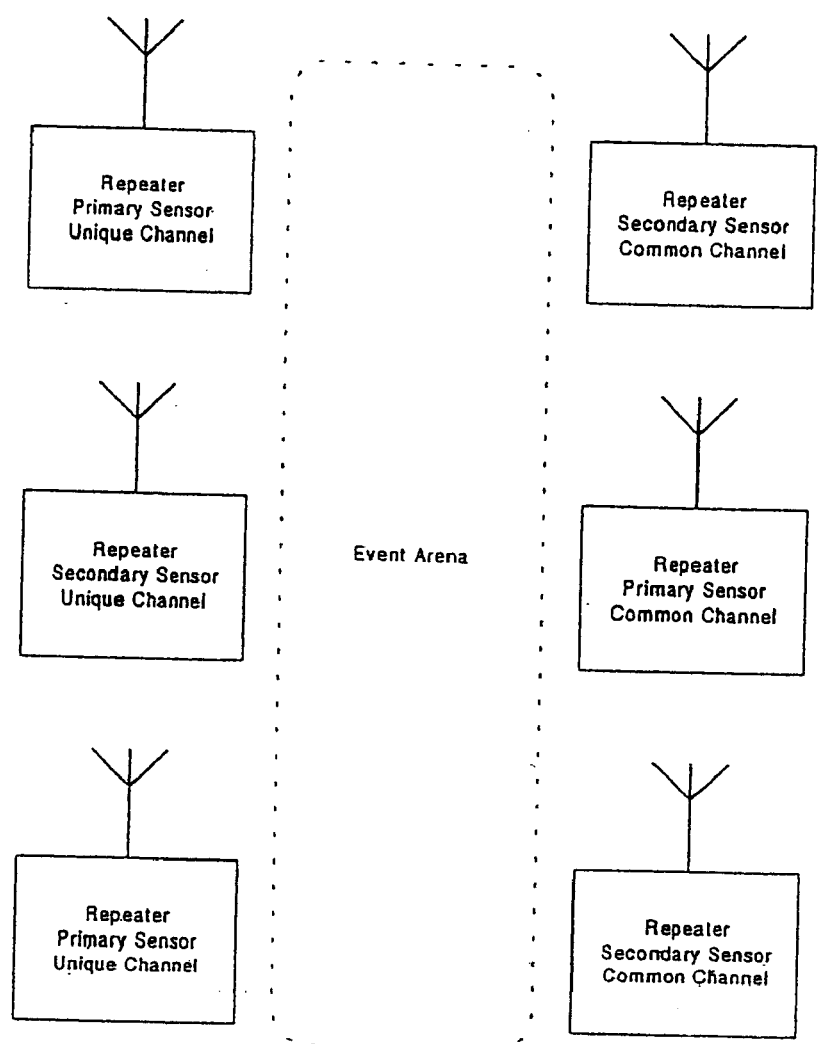

FIG. 4 schematically shows a block diagram of one repeater constructed according to the invention;

FIG. 5 schematically shows a block diagram of one base station constructed according to the invention;

FIGS. 6–8 illustrate timing diagrams to transmit sports metric information to a repeater, according to the invention; and FIG. 9 shows a layout of repeaters around a competition site, in accord with one embodiment of the invention.

DETAILED DESCRIPTION OF PREFERRED EMBODIMENTS

Figure 1:
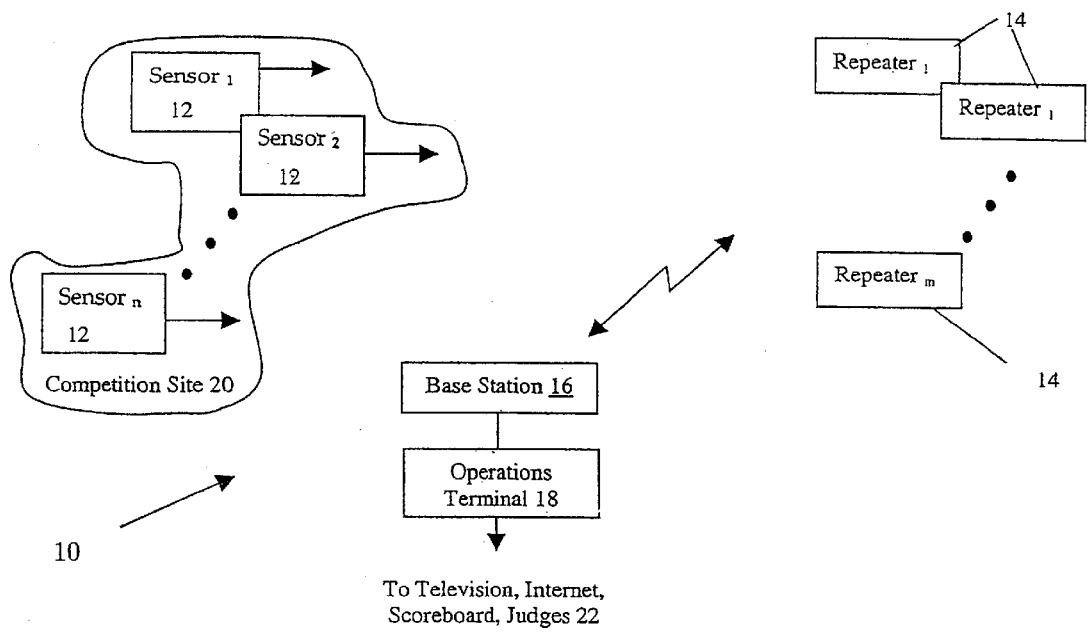
FIG. 1 shows an event system constructed according to the invention.

FIG. 1 shows an event system 10 for use in commercial events and venues. As depicted, system 10 has a plurality of "n" sensors 12, a repeater array of "m" repeaters 14, a base station 16 and an operations terminal 18. A typical competition at an event (i.e., illustrated by competition site 20) uses 1–30 sensors 12 (i.e., "n" is an integer between one and thirty; though those skilled in the art should appreciate that more sensors can be used in events) and 1–10 repeaters 14 (i.e., "m" is an integer between about one and ten, though those skilled in the art should appreciate that more repeaters can be used). An actions sports park venue (e.g., site 20) has upwards of 750 paying athletes per week and thus requires a similar number of sensors 12, with about 5–10 repeaters 14. In venues, therefore, "n" can be 1–750, or more, and "m" can be 1–25 or more, depending upon the physical layout of the venue 20. Each sensor 12 attaches to the vehicle (e.g., snowboard, ski) of an athlete in competition and communicates airtime event data to the repeaters 14 through a XMHz transmitter (X is typically about 433, 900 or 2400). The repeaters 14 are arranged about or near to the competition site 20 and receive the sports metric event data (e.g., airtime data) through antenna generally pointed toward the site (to minimize receiving extraneous data). Each sensor 12 preferably transmits multiple copies of a sport metric event for redundancy purposes to ensure at least one transmission reaches one repeater 14. The repeaters 14 relay the data to the base station 16 (preferably bi-directionally) through YMHz transmitters (Y is typically at least as big as X). The base station 16 of one embodiment is similar to another repeater 14 in that it relays combined data to the operations terminal 18. The operations terminal 18 is for example a portable laptop computer that collates data to generate results, in real time, to the operator for relay to end users 22 (e.g., judges at a judging station, competitors via a scoreboard, users of the Internet, and/or TV viewers).

Figure 2:
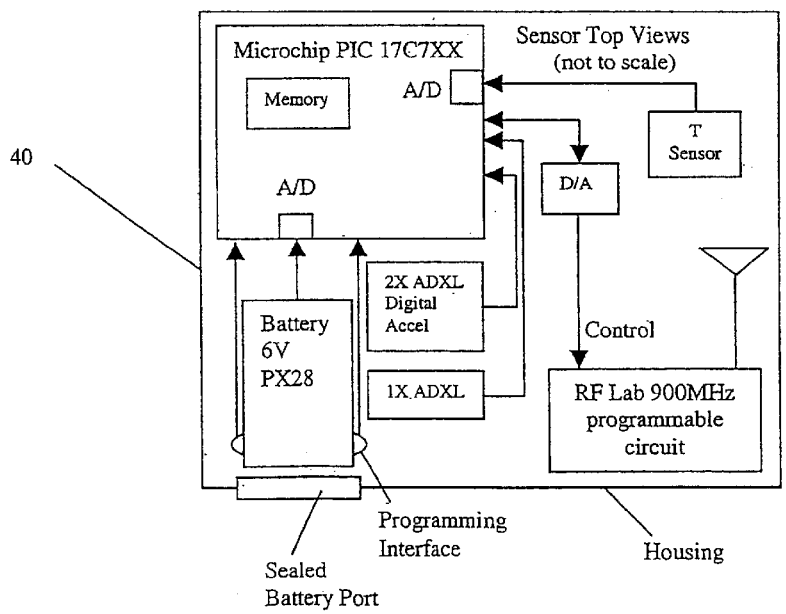
FIG. 2 shows a plan view of one sensor constructed according to the invention.
Figure 3:
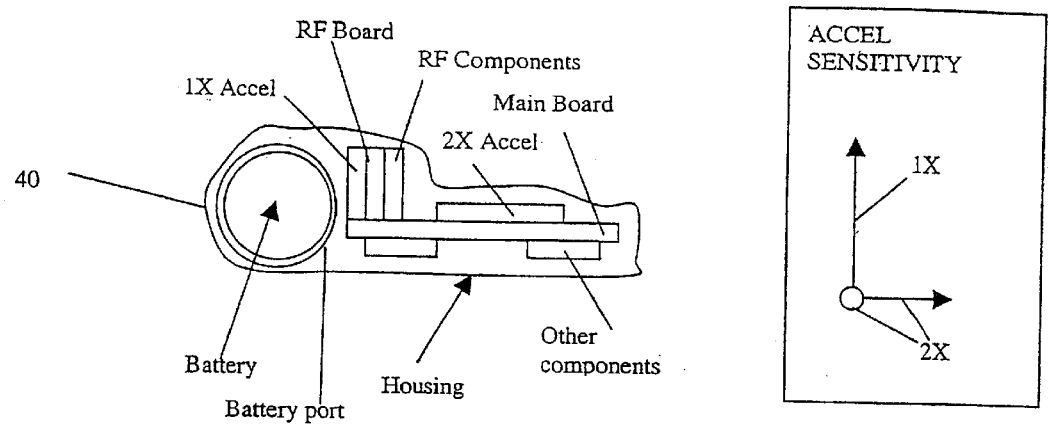
FIG. 3 shows a cross-sectional plan view of the sensor of FIG. 2.

One sensor 40 is shown in FIG. 2 as a top view. Sensor 40 has high processing capability of at least 1 MIP through a processor such as Microchip PIC 17C7XX. Sensor 40 has one or more digital accelerometers such manufactured by Analog Devices. Preferably, there are at least three accelerometers to provide translational acceleration in each axis and/or to provide rotation about each axis (axes being defined with at least one axis substantially perpendicular to motion of the sensor 12). One or more of the accelerometers preferably have free fall capability (i.e., with near DC responsivity). Sensor 40 preferably incorporates temperature-stabilized programmable "XMHz" transmission circuitry, so that one or more channels are programmed for sensor transmission of sports metric data. Sensor 40 further includes a battery which, with other elements, is packaged for portability and durability. FIG. 3 shows a side view of sensor 40, including one preferred orientation of the accelerometers, with one sensitive axis vertical, one perpendicular to the page, and one axis horizontal. The housing of sensor 40 is preferably less than about 1"×1.5"×½" in envelope.

One repeater 60 is shown in FIG. 4. Preferably, all repeaters incorporate temperature stabilized programmable "YMHZ" receiver and transceiver transmission circuitry, and packaging to provide portability and durability.

The foregoing provides certain non-limiting advantages, such as:

All transmission electronics (sensor, repeater, base station) temperature stabilized (−20 C to 40 C) through temperature sensing, voltage control of X or YMHz oscillator Longer sensor battery life (−20 C to 40 C)

Integrated, sleek, durable housings for sensor

Portable and compact housing for repeaters and base station

Programmable frequency selection in unlicensed XMHz band

Programmable upgrades permitted in sensor processor

Multiply for adaptive filtering within sensor

Sensor foundation suitable for other sports metrics (e.g., g's, impact, speed, drop distance, spin).

Two-way communications between base station and repeaters

Sensor design suitable for in-silicon processors for PICs, z80s and the like, as well as for accelerometers and RF sections wit XMHz, such as licensed bands and/or Bluetooth.

Data Operations

System 10 preferably operates with multiple redundant data packets, described in more detail below. The proposed software controlled protocols are only suggestions and are open to change and improvements after simulation and evaluation, as known in the art. Goals of system 10 are to have high system reliability and usability through the data collection mechanism and sensor data transmission algorithms reduce overall latency of event messages through system 10, allowing system 10 to generate a real-time dock control signals for sport metric event times, desired for both scoreboards results of individual metrics, and for live television feeds incorporate multi-channel RF communications and a bi-directional Base Station/Repeater link, making system 10 fully configurable to single competitors as well as multi-competitor events with minimal hardware modifications to support multiple metrics, sensor platforms, and sports.

The Radio Frequency links between Sensor and Repeater, and between Repeater and Base Station, are preferably redundant. In one embodiment, the Sensor/Repeater RF link operates in one direction only, from Sensor to Repeater. The sensor transmitter for example uses the 900 MHz frequency band, which is license exempt and provides in excess of 60 separate channels of communication. A baud rate of 2400 minimum is typically used between the sensor and repeater. The Sensors preferably have a multi-channel capable transmitter. The transmission channel is preferably selected under software control.

The Repeaters each have a receiver matching the Sensor transmitter with software controlled channel selection. The Repeater preferably monitors a single Sensor channel while simultaneously communicating with the Base Station.

The Repeater/Base Station link preferably utilizes either a selectable multi-channel link, or a spread spectrum link for reliability of operation. A half-duplex link will be sufficient; however the baud rate is typically greater than 9600.

During operation of the Event System 10, two channels are for example chosen as "Common" channels, and other channels will then be used as "Unique" channels for individual competitors. While it is a goal to have sufficient unique channels for all competitors (two unique channels per competitor, one for each sensor used), judicious selection of channels may allow competitors competing at different time to use the same channels.

Sensor Design and Use Issues

Two sensors are preferably allocated to each competitor for enhanced reliability, a primary sensor and a secondary sensor. Each sensor is preferably configured with two transmission channels; a unique channel assigned to that sensor, and one common channel. The two sensors then use different common channels.

The sensor for example transmits event information on the unique channel first, and then the common channel. This ensures that even if the Repeaters are not configured to receive the unique channel at the correct time, the common channel will always be received. A competitor can thus have two sensors using four channels for data communication to the Event collection system 10.

The Sensor can transmit data at 2400 baud, for example. This data rate ensures sufficient reliability of the link while providing adequate bandwidth for event information. A typical message will consist of 15 bytes of information that will take 50 ms to transmit. This may include redundancy information, if necessary.

In the preferred embodiment, as shown in FIGS. 6, 7 and 8, there are three scenarios that can occur when a sensor detects an event:

a) If the sensor is not currently transmitting data, it will immediately start transmitting the new event information on its unique channel. Once this transmission is complete, it will retune the transmitter to its common channel and transmit the message again (with adjusted age information). This sequence will be repeated a finite number of times with a suitable delay between transmission pairs to allow for intermittent signal blocking to pass. There will no longer be a psuedo-random transmission sequence.

b) If the sensor is already transmitting an event for the first time, the event will be queued for immediate transmission following the completion of any prior event first time transmissions.

c) If the sensor is repeating an event message, i.e. it is not the first time the event is being transmitted, then this transmission is aborted and the new event message is started immediately after switching to the unique channel if necessary. The transmission protocol will allow detection of interrupted messages at the Repeater.

The sports metric algorithm in a sensor is designed to filter out "noise" occurrences in the signal, such as ski clicks in mid-air. This gives a maximum event rate for a sensor of approximately 5 events per second, although an athlete should not generate more than four events per second while skiing moguls.

FIG. 9 shows one diagram with one layout of the Repeaters around the event arena, in accord with the invention.

Figure 10A:
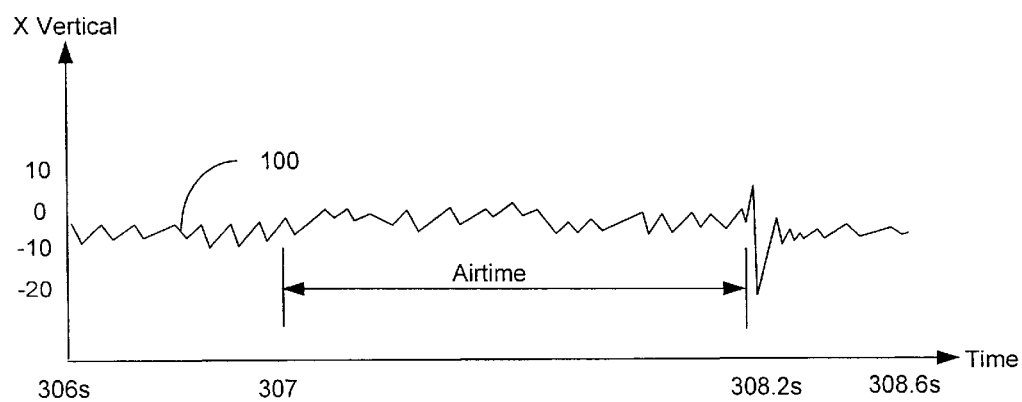
Figure 10C:
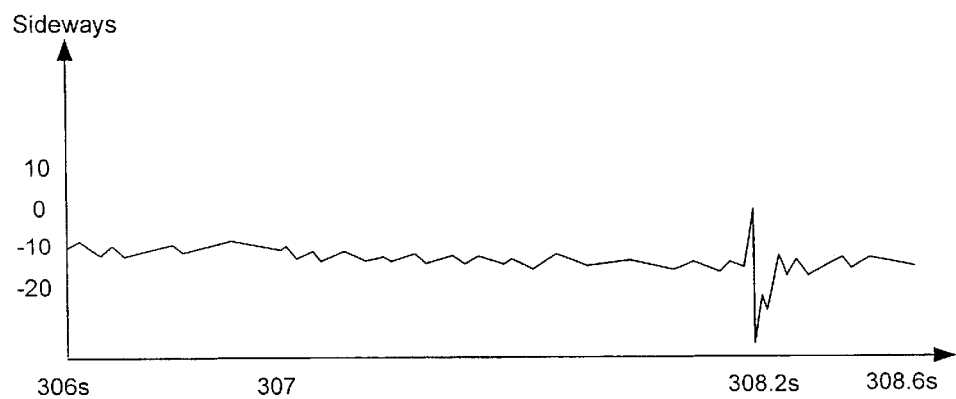
Figure 10B:
Figure 10D:
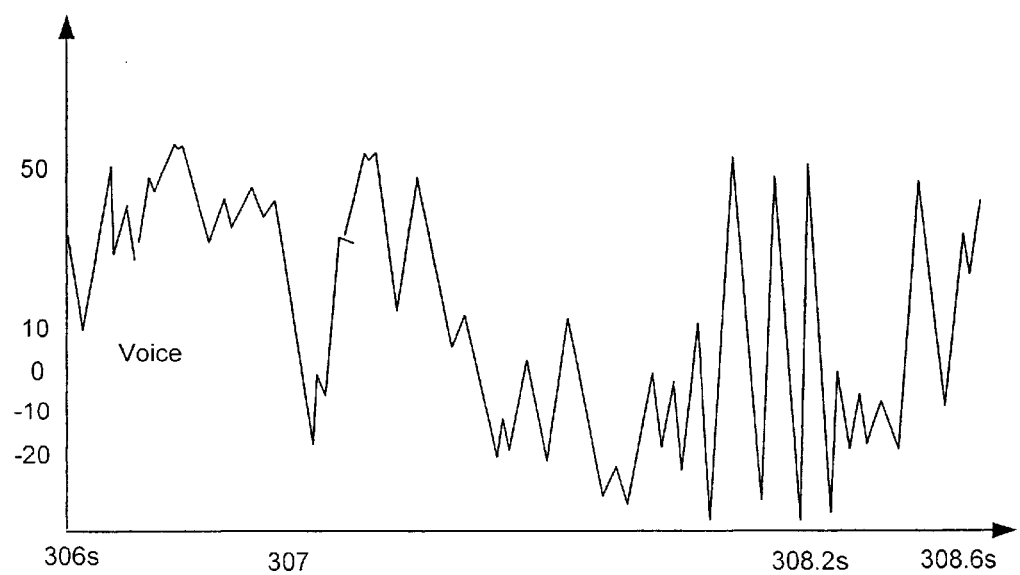
Figure 11:
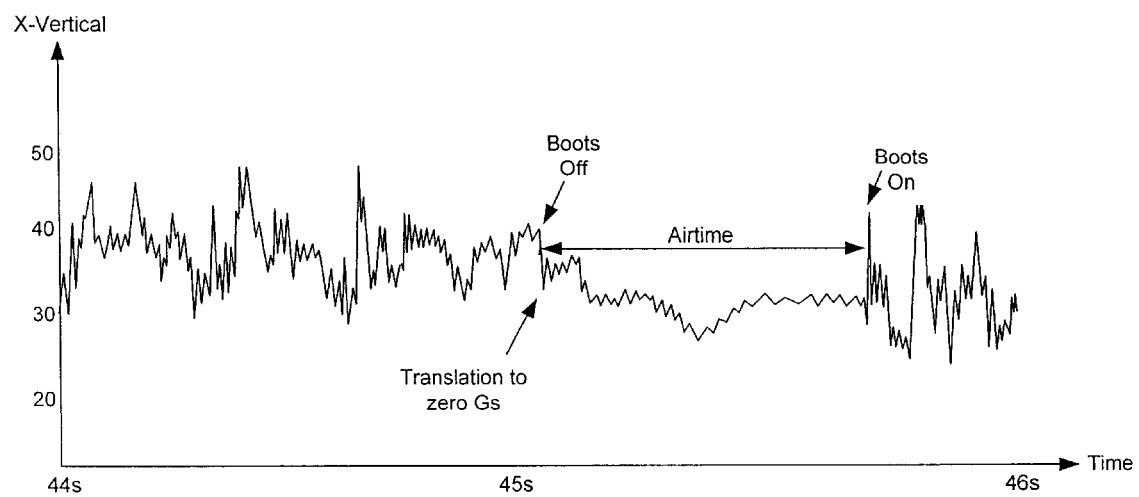

FIGS. 10A–10C show data acquired from accelerometers attached to a skier's hip, and FIG. 10D shows voice data acquired simultaneously with the data of FIGS. 10A–10C for analysis purposes. FIG. 10A illustrates, for example, that with a low frequency accelerometer (e.g., an accelerometer with "DC" or free-fall detection), then airtime is detected by a level shift of data 100. Such a level shift helps detect airtime and may be used in conjunction with absence of spectrum information such as described in Appendix B. FIG. 11 further illustrates a level shift due to a free fall accelerometer mounted on a boot, where airtime is again detected with the level shift, as illustrated. Once again, frequency analysis of the data 102 may be appropriate to consider with the level shift in the determination of airtime. The mounting of sensors to acquire data such as shown in FIGS. 10 and 11 is for example shown in FIG. 20 of Appendix B, where a sensor is mounted to the waist (to acquire data similar to data 100) and a sensor is mounted to a ski (to acquire date a similar to data 102).

In view of the foregoing, what is claimed is:

1. A sensor, comprising a processor, a first accelerometer, a RF section, and temperature drift correction circuitry, the first accelerometer sensing one or both of vibration and free fall data, the processor connected with the accelerometer and utilizing an adaptive filter to process the data to determine sports metric information, the RF section communicating the information wirelessly to external devices, and the temperature drift correction circuitry compensating for temperature changes in the sensor to reliably communicate the information to the external devices.

2. A sensor of claim 1, further comprising a second and third accelerometers, the processor connected with the second and third accelerometers to determine or refine the sports metric information.

3. A sensor of claim 1, wherein the sports metric information comprises one or more of airtime, g's, impact, drop distance, spin and rotation.

4. A sensor of claim 1, further comprising one or more rotational accelerometers.

5. A method of determining airtime, comprising the steps of mounting at least one accelerometer with free fall detection to an athlete, detecting level shifts of acceleration data to determine airtime, and using an adaptive filter to finesse the determination of airtime.

6. A method of claim 5, further comprising mounting the accelerometer at a waist of the athlete.

7. A method of claim 5, further comprising mounting the accelerometer to a boot or vehicle of the athlete.

8. A method of claim 5, further comprising mounting at least two accelerometers to the athlete, one at a waist of the athlete and one at a boot or vehicle of the athlete.

9. A method of claim 5, further comprising detecting a spectrum of information from the accelerometer and detecting an absence of the spectrum in the determination of airtime.

10. A method for determining airtime from acceleration data acquired from a ski, comprising mounting one or more accelerometers with the ski and monitoring frequencies of data from the accelerometers to detect airtime based upon change information in one or more frequencies of data, and processing the data with adaptive filters to compensate data for snow conditions and for reducing noise generated from ski clicks, the ski clicks defined by two skis connecting during an airtime event.

* * * * *